(12) United States Patent
Caillon et al.

(10) Patent No.: US 7,065,229 B2
(45) Date of Patent: Jun. 20, 2006

(54) METHOD FOR PROCESSING LARGE-SIZE POSTAL OBJECTS IN A SORTING INSTALLATION

(75) Inventors: Christophe Caillon, Brétigny sur Orge (FR); Hervé Lagrange, Paris (FR)

(73) Assignee: Solystic, Gentilly cedex (FR)

( * ) Notice: Subject to any disclaimer, the term of this patent is extended or adjusted under 35 U.S.C. 154(b) by 631 days.

(21) Appl. No.: 10/239,779

(22) PCT Filed: Jul. 23, 2001

(86) PCT No.: PCT/FR01/02395

§ 371 (c)(1),
(2), (4) Date: Sep. 25, 2002

(87) PCT Pub. No.: WO02/07904

PCT Pub. Date: Jan. 31, 2002

(65) Prior Publication Data

US 2003/0048925 A1   Mar. 13, 2003

(30) Foreign Application Priority Data

Jul. 25, 2000  (FR) .................................. 00 09737

(51) Int. Cl.
    *G06K 9/00*   (2006.01)
    *G06K 9/20*   (2006.01)
(52) U.S. Cl. ...................... 382/101; 382/282; 382/299
(58) Field of Classification Search ................ 382/101, 382/102, 282, 299
    See application file for complete search history.

(56) References Cited

U.S. PATENT DOCUMENTS 4,672,681 A   6/1987  Goldkuhle
4,941,195 A * 7/1990  Tanaka et al. ............... 382/282
5,311,999 A * 5/1994  Malow et al. ............... 209/583
5,770,841 A * 6/1998  Moed et al. ................. 235/375
5,880,728 A * 3/1999  Yamaashi et al. ........... 715/803
6,028,608 A * 2/2000  Jenkins ....................... 345/619
6,043,802 A * 3/2000  Gormish ..................... 345/596
6,236,735 B1* 5/2001  Bjorner et al. .............. 382/101
6,252,989 B1* 6/2001  Geisler et al. .............. 382/232
6,496,607 B1* 12/2002 Krishnamurthy et al. ... 382/282

(Continued)

FOREIGN PATENT DOCUMENTS

EP        0076332 A1    4/1983

(Continued)

*Primary Examiner*—Bhavesh M. Mehta
*Assistant Examiner*—Anthony Mackowey
(74) *Attorney, Agent, or Firm*—Sughrue Mion, PLLC

(57) ABSTRACT

The method of processing postal objects of large size in order to read automatically a postal address (AD) on each object consists in acquiring a digital image of each object at a certain level of resolution; in detecting in the image one or more zones of interest (ZI) apparently containing a postal address; in performing automatic address recognition on each zone of interest in order to extract a postal address (AD) of the object, and in the event of the automatic address recognition failing, in displaying each zone of interest (ZI) on a screen so that a video-coding operator can read the postal address (AD) of the object. Each zone of interest (ZI) is displayed on the screen on a screen context background (F) that is representative of the object but at a level of resolution that is lower than the level of resolution of the digital image and the zone of interest. In this way, the video-coding operator has an overall view of the detected zones of interest, thus making it easier to read the postal address of the object.

3 Claims, 2 Drawing Sheets

U.S. PATENT DOCUMENTS 6,665,422 B1 * 12/2003 Seidel et al. ................. 382/101
6,728,391 B1 * 4/2004 Wu et al. ................... 382/101
6,809,731 B1 * 10/2004 Muffler et al. ............... 345/428

FOREIGN PATENT DOCUMENTS

FR  2589267 A1  4/1987

* cited by examiner

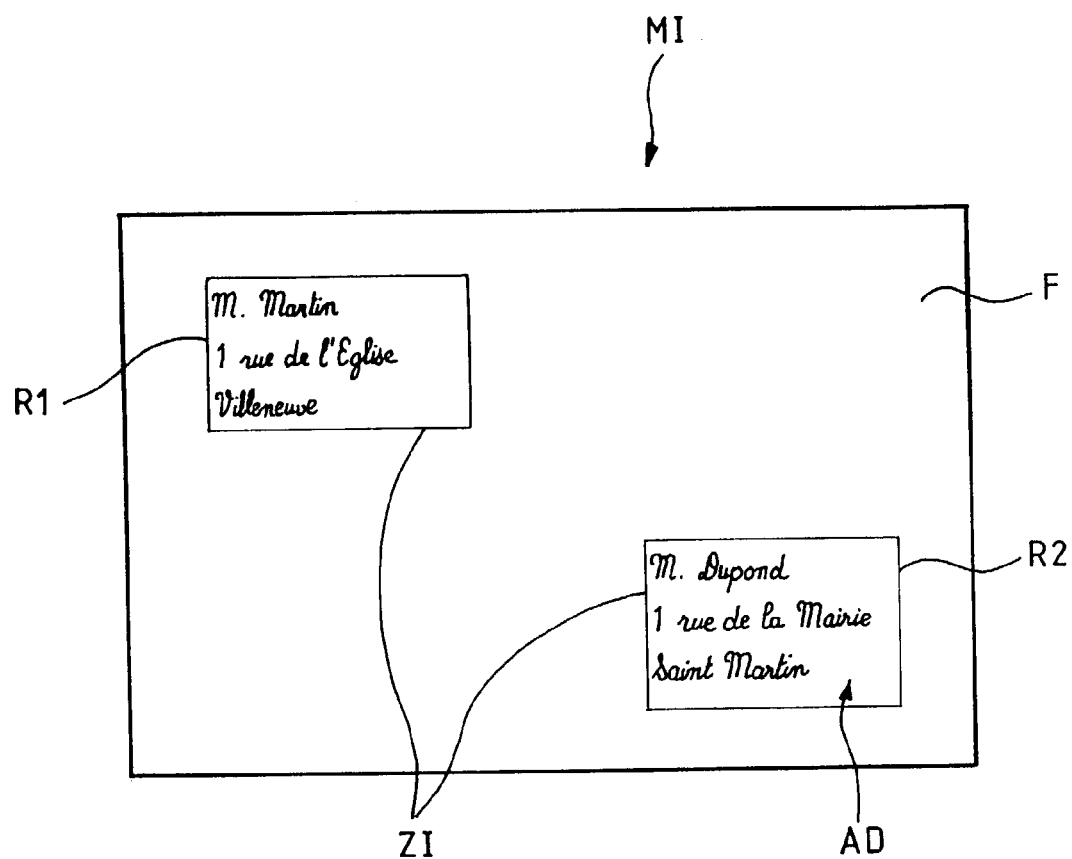
FIG_1

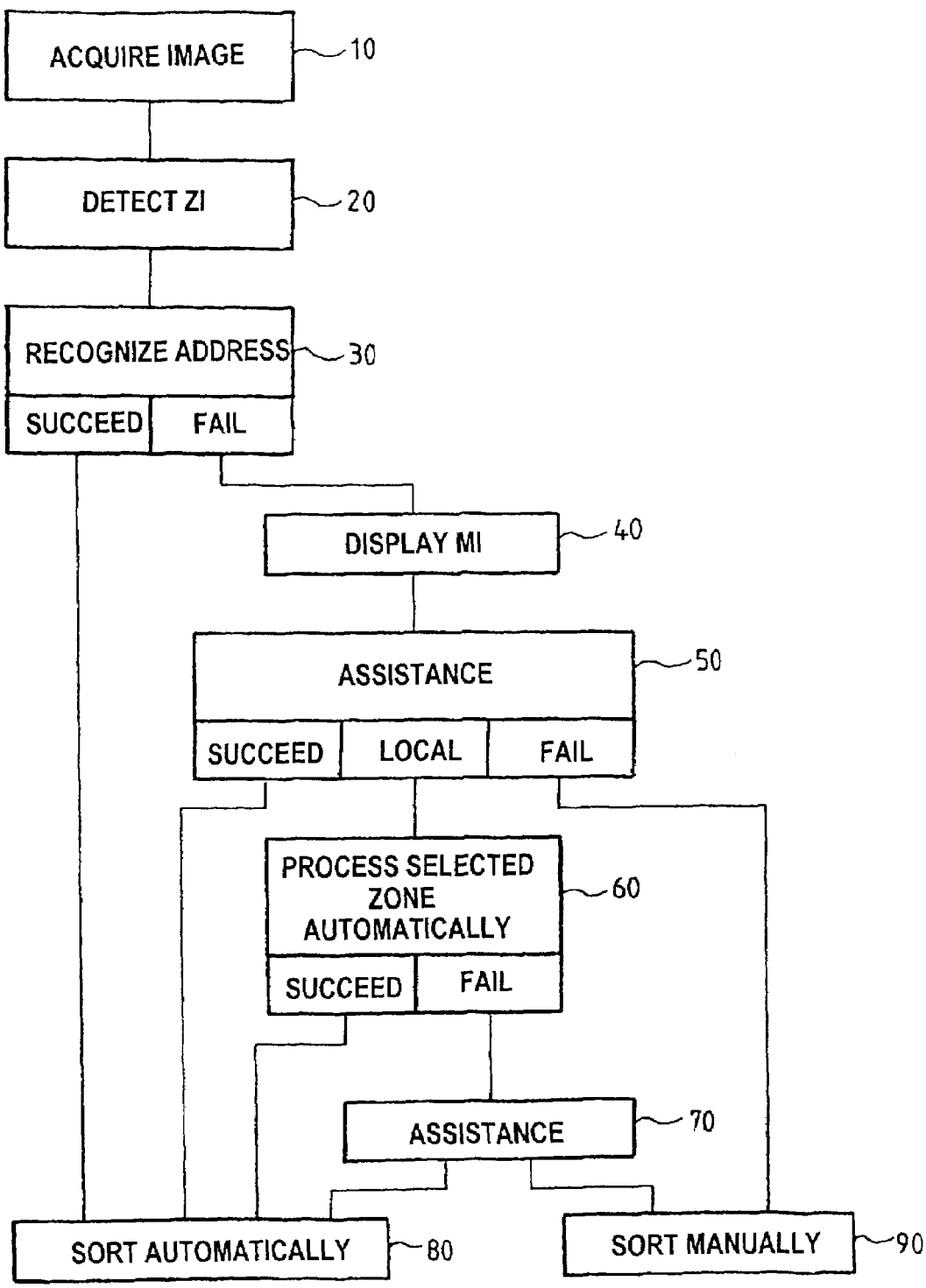
FIG_2

METHOD FOR PROCESSING LARGE-SIZE POSTAL OBJECTS IN A SORTING INSTALLATION

The invention relates to a method of processing postal objects, in particular packets, for the purpose of automatically reading a postal address on each object, the method including a step of assistance by means of video-coding, consisting for each object in performing the following steps:

a) acquiring a digital image of the object at a certain level of resolution;

b) detecting in said digital image of the object one or more zones of interest of the image each apparently containing a postal address;

c) applying an automatic address recognition algorithm to each zone of interest detected in the image of the object in order to extract a postal address of said object; and in which in the event of the step of automatic address recognition failing, each zone of interest is displayed on a screen of a video-coding station in order to enable an operator to perform semi-automatic processing to read the postal address of said object.

Such a method is used more particularly in postal sorting where, on the basis of automatically reading the destination postal address, each packet is delivered on exit to a bin corresponding to its destination. More specifically, the system for processing, managing, and controlling such an installation is generally computerized in such a manner that identifying a postal address corresponds to the computer system acquiring part or all of said postal address. In such a method, the postal address to be identified is generally the destination address of the packet.

A destination address can be identified by recognizing the address automatically, providing the address is easily readable, by semi-automatic processing using a video-coding operator if the address is fairly readable, and by manual processing if the address is difficult to read. Such identification generally comprises acquiring an image of the packet at a particular level of resolution referred to as "high" resolution; detecting one or more zones of interest in said image, said zones of interest apparently containing the destination address; and attempting to recognize an address automatically in each zone of interest in order to identify the destination address that appears on the packet. If automatic address recognition fails, then each zone of interest is displayed on a screen of a video-coding station so that a video-coding operator can assist in identifying the destination address. In the most unfavorable circumstances, where the video-coding operator does not manage to identify the destination address, the operator can specify a zone of interest in which to make a new attempt at recognizing an address automatically, or can cause the packet to be delivered to a special outlet bin so that a video-coding operator can identify the destination address by reading it directly from the packet.

In general, each zone of interest is displayed on its own, and that does not always give the video-coding operator enough information to be able to identify the destination address. In particular, the position of each zone of interest relative to the packet can constitute part of the information needed, for example in order to distinguish between the destination address and the sender's address.

The object of the invention is to remedy those drawbacks.

To this end, the invention provides a method of processing postal objects, in particular packets, in order to read a postal address automatically on each object, the method including a step of assistance by video-coding, and consisting for each object in performing the following steps:

a) acquiring a digital image of the object at a certain level of resolution;

b) detecting in said digital image of the object one or more zones of interest of the image each apparently containing a postal address;

c) applying an automatic address recognition algorithm to each zone of interest detected in the image of the object in order to extract a postal address of said object; and in which in the event of the step of automatic address recognition failing, each zone of interest is displayed on a screen of a video-coding station in order to enable an operator to perform semi-automatic processing to read the postal address of said object, the method being characterized in that in the event of the step of automatic address recognition failing, each zone of interest is displayed on the screen on a screen context background representative of said digital image of the object but at a level of resolution that is lower than said certain level of resolution of the digital image.

Such a method shows the relative position of each zone of interest on the packet, thus providing considerable additional information to make it easier for a video-coding operator to identify the destination address on the packet.

In a particular implementation of the invention, in which all of the zones of interest detected in a digital image of an object are displayed together on said screen context background in the event of the automatic address recognition step failing, a method is obtained in which the video-coding operator can distinguish directly between a destination postal address and a sender's postal address by displaying the relative positions of said addresses on the packet.

In another particular implementation of the method of the invention, in which each zone of interest is displayed on the screen at an intermediate level of resolution higher than the level of resolution for the screen context background and lower than the level of resolution for the digital image of the object, a method is obtained in which the amount of computer data transmitted to the video-coding station is reduced, so that the time required to transmit said data is compatible with the throughput rate.

The invention is described below in detail and with reference to the accompanying drawings, which show an implementation by way of non-limiting example.

FIG. 1 is a diagrammatic view of an image displayed on the screen of a video-coding station, showing two zones of interest.

FIG. 2 is a flow chart of the method of the invention.

FIG. 2 is in the form of a flow chart showing a method of processing postal packets in order to read a postal address automatically on each packet being conveyed through a postal sorting installation to a sorting exit that corresponds to the postal address, the method including a step of providing assistance by video-coding in the event of it not being possible to read the postal address automatically.

Each packet is thus conveyed so as to pass it in front of a camera, and in step 10, the camera takes a digital image of one or more faces of the packet at a high level of resolution. For a packet of large dimensions, for example a packet in which one of the faces is a rectangle of 1 meter (m) by 80 centimeters (cm), the computer file in which the high resolution image of the packet is stored will be of a size of about 40 megabytes, assuming that acquisition is at a resolution of 7 pixels per millimeter (mm) with a gray scale having 256 levels.

In step 20, a processing algorithm is applied to the digital image coming from step 10 for the purpose of detecting within said image one or more zones of interest likely to contain a postal address, and in particular the destination address for the packet in question. Such zones of interest can be detected, for example, on the basis of thresholding applied to the pixels of the digital image, because zones of interest generally have a background color which defines a kind of label in the digital image that is different from the dominant background color of the packet. The sorting installation has one or more video-coding stations, and if no zone of interest is detected automatically in step 20, then the image of the packet is displayed on the screen of a video-coding station so that the zone of interest can be defined by a video-coding operator.

In step 30, an automatic address recognition algorithm is applied to each zone of interest in order to extract a postal address automatically therefrom. The outcome of step 30 is successful when only one zone of interest is detected in step 20, and when a postal address has been suitably extracted from said zone of interest in step 30. The outcome of step 30 is a failure if no postal address has been extracted from a zone of interest detected in step 20, for example if the characters are not machine-readable. The outcome of step 30 is also a failure if a plurality of postal addresses are extracted from a plurality of zones of interest and it is not possible automatically to determine which is the postal address corresponding to the destination. These examples of outcomes that lead to failure are not limiting on the method of the invention.

More particularly, for each zone of interest, analysis can comprise an attempt at extracting one or more strings of characters by optical character recognition (OCR), followed by analyzing each string of characters in an expert system capable of detecting whether or not a string of characters possesses the characteristics of a postal address.

As shown in FIG. 2, in the event of step 30 being successful, the method continues in step 80 by the packet being conveyed towards a sorting exit that corresponds to the destination address that has been decoded from the image of the packet.

In the event of step 30 failing, each zone of interest detected in step 20 is displayed at 40 on the screen of a video-coding station in order to be processed by a video-coding operator in step 50. If a plurality of zones of interest are detected during step 20, they can advantageously be displayed together on the screen of a video-coding station in step 40.

FIG. 1 shows two rectangles R1 and R2 outlining two zones of interest ZI that have been detected in step 20 on a packet, and these two zones of interest are displayed together on the screen in a screen context background F which is representative of the image of the packet obtained in step 10. The screen background F having one or more zones of interest ZI constitutes a meta-image MI in which there can be seen the destination postal address AD which appears in rectangle R2. In this meta-image, the context background F which is the image of the face of the packet as acquired in step 10, is displayed on the screen at a level of resolution that is lower than the level of resolution used for the digital image obtained in step 10, for the purpose of reducing the size of the computer files that needs to be transmitted to the video-coding station so that the time required for transmitting the file can be made compatible with the rate at which the sorting installation operates. In a variant, the video-coding station can display the screen background F at a level of resolution that is matched to the resolution of the screen at the station, enabling each zone of interest to be magnified instantaneously.

As an indication, the level at which the screen background F is displayed could be 1 pixel per millimeter, compared with the 7 pixels per millimeter in the digital image obtained in step 10. The level of resolution in the zones of interest ZI in the meta-image MI must be sufficient to enable the postal address to be read directly from the screen by the video-coding operator. To further accelerate transmission times, the zones of interest ZI in the meta-image can be displayed on the screen at an intermediate level of resolution that is higher than the level of resolution used for the screen background, but lower than the level of resolution in the digital image as obtained at 10. By way of example, this intermediate level of resolution could be 4 pixels per millimeter.

Consequently, in step 40, the video-coding operator views one or more zones of interest on the screen together with their context on the face of the packet that appears in the acquired image, thus making it possible for the operator, for example, to determine which of the zones of interest contains the destination address. On the basis of this display, the video-coding operator then acts in step 50 to cause the postal address to be read semi-automatically.

In step 50, three situations are possible: step 30 might have been able to decode a plurality of addresses without being able to determine automatically which is the destination address, or it might not have been able to decode any address even through the selected zone is indeed the zone containing the destination of the packet; step 30 might have failed to identify any address because the destination address does not appear in the acquired image; or step 30 has not managed to identify any address because the destination address is in the image but lies outside the zones of interest as detected in step 20. In the first situation, the operator selects directly on the screen the zone of interest that contains the destination address, or the operator inputs the destination address when it appears in a zone of interest that has been selected automatically but that has not been read automatically, so that the packet is then conveyed towards a corresponding sort exit of the sorting installation, in step 80. In the second circumstance, the video-coding operator observes that the destination address does not appear in the image displayed on the screen of the video-coding station, and the corresponding packet is sorted manually in step 90. In the third circumstance, the video-coding operator observes that the destination address lies within the image but outside the zones of interest as detected automatically in step 20, so the operator cancels the zones of interest as detected automatically and manually defines the zone of interest that contains the destination address and submits this zone to the algorithm for automatic address recognition in step 60. Thus, step 60 can either lead to the packet being sent to a corresponding sorting exit in step 80 if the address is successfully recognized automatically, or else to the packet being sent to other processing 70 in the event of the address not being recognized automatically. In step 70, the video-coding operator uses the keyboard to manually input the destination address that appears in the zone of interest as defined during step 50 but that has not been read automatically in 60, so as to send the packet to an automatic sorting exit in step 80. If the address is illegible, then the operator rejects the packet so that it is sent to manual sorting in step 90.

As can be seen, the method of the invention is particularly applicable to postal packets of large dimensions for which failures of automatic postal address reading are frequent, given that such packets are often covered in stickers, labels, bar codes, etc.

The invention claimed is:

1. A method of processing postal objects, in particular packets, in order to read a postal address (AD) automatically on each object, the method including a step of assistance by video-coding, said method comprising the following steps for each object:
   acquiring (10) a digital image of the object at a first level of resolution;
   detecting (20) in said digital image of the object one or more zones of interest (ZI) of the image each apparently containing a postal address;
   applying an automatic address recognition algorithm to each detected zone of interest in order to extract a postal address (AD) of said object; and
   if the automatic address recognition step fails, displaying each zone of interest (ZI) at a second level of resolution on a screen of a video-coding station on a screen context background (F) representative of said digital image of the object in order to enable an operator to perform semi-automatic processing (50) to read the postal address (AD) of said object, wherein the screen context background is displayed on the screen at a third level of resolution that is lower than said second level of resolution.

2. The method of claim 1, in which all of the zones of interest detected in a digital image of an object are displayed together on said screen context background if the automatic address recognition step fails.

3. A method according to claim 1, in which said second level of resolution is lower than said first level of resolution.

* * * * *